United States Patent [19]
Wood

[11] Patent Number: 5,419,588
[45] Date of Patent: May 30, 1995

[54] DOCUMENT BACKER

[76] Inventor: Daniel J. Wood, 535 Cordova Rd., Suite 151, Santa Fe, N. Mex. 87501

[21] Appl. No.: 813,595

[22] Filed: Dec. 26, 1991

[51] Int. Cl.⁶ .......................................... G06K 19/02
[52] U.S. Cl. ...................................... 283/58; 283/62; 283/101; 283/109; 283/110; 235/487; 235/488; 235/493
[58] Field of Search ................... 283/58, 62, 59, 101, 283/109, 110; 40/158.1; 346/135.1; D19/11; 428/900; 235/487, 493, 488

[56] References Cited

U.S. PATENT DOCUMENTS

| | | | |
|---|---|---|---|
| 3,359,913 | 12/1967 | Bremer | 235/487 X |
| 3,363,917 | 1/1968 | Gunderson et al. | 283/58 X |
| 3,576,972 | 5/1969 | Wood et al. | 235/487 |
| 3,588,456 | 6/1971 | McNabb | 235/487 |
| 3,702,924 | 11/1972 | Wood et al. | 283/58 X |
| 3,770,943 | 11/1973 | Sill | 283/58 X |
| 3,800,124 | 3/1974 | Walsh | 283/58 X |
| 4,278,880 | 7/1981 | Buros | 235/487 X |
| 4,586,975 | 5/1986 | Derby | 283/58 X |
| 4,927,071 | 5/1990 | Wood | 235/493 X |
| 4,934,587 | 6/1990 | McNabb | 235/487 X |

FOREIGN PATENT DOCUMENTS 2243329 10/1991 United Kingdom ............... 283/101

Primary Examiner—Frances Han
Attorney, Agent, or Firm—William A. Eklund

[57] ABSTRACT

A document backer for supporting and carrying damaged checks, drafts and other financial documents through data processing machines. The document backer includes a translucent backing sheet with a vellum strip adhered to the lower edge thereof. The backing sheet includes an adhesive for affixing a check or other document thereto. The vellum strip is suitable for imprinting with magnetically readable characters. The document backer may also include a detachable cover sheet that is removed just prior to use. The document backer is particularly adapted to digital imaging systems, as the face of the check may be supported and presented as originally prepared, with no visual distortion or impairment, while the entire surface of the back of the check may also be photographed or microfilmed through the translucent backing sheet.

11 Claims, 3 Drawing Sheets

DOCUMENT BACKER

BACKGROUND OF THE INVENTION

1. Field of the Invention

The invention described and claimed herein is generally related to document backers, carriers and other repair devices for processing damaged checks and the like through automatic processing equipment which utilize magnetically readable characters. More specifically, the present invention is related to document backers suitable for use with contemporary digital imaging check processing systems.

2. Description of Related Art Including Information Disclosed Under 37 CFR 1.97-1.99.

For about thirty years checks and certain other financial documents have been routinely imprinted with magnetic ink characters, commonly known as MICR characters. MICR characters typically identify the bank on which the check is drawn, the account number of the drawer, and the serial number of the check. These characters are typically readable visually as well as magnetically through the use of special document reading equipment. The characters are typically imprinted along the lower edge of the face of the check or other document. The MICR characters are magnetically readable by "reader-sorter" data processing equipment, through which the checks are processed, read and sorted.

Although various documents may be processed utilizing MICR characters and the associated data processing equipment, for purposes of simplicity the following discussion will refer simply to checks. It will be understood however that all references to checks in this specification are equally applicable to other documents that may be processed in a similar manner.

Millions of checks are processed by the banking industry each day. Processing of each check typically involves several steps. For example, the amount of the check is typically imprinted on the face of the check in magnetically readable characters by clerical personnel. The faces and/or backs of the checks are typically photographed or microfilmed for record keeping purposes. Finally, the checks are passed through reader-sorter data processing equipment which automatically reads the magnetic characters and sorts the checks accordingly. Additionally, as discussed further below, digital imaging equipment is increasingly being used to read and record the information contained on the faces of checks.

Checks may generally be damaged in two ways that impair their automated processing. First, they may be physically torn, mutilated, crumpled, water-damaged or otherwise physically damaged, necessitating that they be reconstructed as best as possible so that they can be read, subsequently photographed, microfilmed or digitally imaged, and also be mechanically processed through document handling equipment.

Secondly, the magnetically readable characters on a check may be damaged or rendered inoperative, for example by exposure to magnetic objects. Checks damaged in this manner are typically repaired by attaching to the check a strip of paper, on which substitute magnetically readable characters are imprinted to replace the damaged MICR characters on the face of the check.

A similar repair is typically performed to correct errors in the MICR characters. Since the amount of each check is typically imprinted on the face of the check in magnetically readable characters by clerical personnel prior to automated processing, there is the possibility of human error being introduced during this step, and in fact such errors occur with some regularity. Such an error results in a miscoded check which must be corrected in the same manner as a check on which the magnetically readable characters are damaged.

Various document repair devices are known in the banking industry to repair damaged checks and to correct checks having altered, unreadable or erroneous magnetic characters. In some cases such devices are intended to only replace the magnetically readable characters. In other cases they are further intended to support and carry physically damaged or unreadable checks through the data processing machines which sort the documents by reading the magnetic characters imprinted on the documents.

The simplest repair device is the repair strip, which is a strip of paper or vellum that is adhered to the lower edge of a check, so as to essentially form an extension of the lower edge of the check, and which can be imprinted with magnetically readable characters which substitute for the characters which have been rendered unreadable on the original check. Examples of repair strips are disclosed in the U.S. Pat. Nos. 3,770,943 to Sill and 4,586,975 to Derby. Although repair strips are suitable for replacing unreadable magnetic characters, they do not function to repair a check that is torn or otherwise damaged.

Another class of repair devices consists of document carriers, which take the form of an envelope that supports and carries a torn or damaged check, and which typically also includes an integral repair strip that can accept magnetically readable characters. These devices serve the dual purposes of supporting a damaged check while it is carried through a data processing machine, while also replacing the magnetically readable characters on the check. Examples of such document carriers are disclosed in the U.S. Pat. No. 3,576,972 to D. J. Wood and H. E. Wood; and in the U.S. Pat. No. 4,927,071 to Wood.

There are also devices known as document backers, which include a backing sheet that is adhered to the back of a damaged check, as disclosed for example in U.S. Pat. No. 3,363,917 to Gunderson et al. One problem with the document backer disclosed by Gunderson et al. is that the backing sheet is substantially opaque and thus covers the endorsements and other processing instructions typically imprinted on the back of the check, and which are important in establishing and audit trail in the event a check is returned for insufficient funds or is stolen. This problem was partially overcome by the document backer subsequently disclosed in U.S. Pat. No. 3,702,924 to D. J. Wood and H. E. Wood, which includes a C-shaped backing sheet that leaves a major portion of the back of the check exposed so that endorsements and other written or printed information can be read.

The relatively recent advent of digital imaging systems has resulted in new requirements for document processing systems. Modern imaging systems now coming into use utilize digital images of checks for electronic record keeping, as opposed to the keeping of paper records or even photographic or microfiche records. Additionally, and more importantly, modern imaging systems are increasingly being used to automatically scan and read the dollar amount of a check, through the use of computer programs which enable the system to read handwritten as well as printed numerals. It will be appreciated that this automated capability eliminates the relatively time-consuming and labor-intensive step of manually reading and entering the amount of each check into a data processing system.

It is this latter development which has resulted in the new requirements being imposed on document processing systems. In particular, the face of a check must be completely visible and unimpaired by any kind of cover sheet, even cover sheets which are quite translucent, as provided for example in the document carrier disclosed in U.S. Pat. No. 4,927,071 to Wood. 18 Although the face of the check must be completely visible, there still remains the requirement that the check be adequately supported and carried in the event that it is physically damaged, so that it can be processed through automated document handling equipment. Further, a check that has been damaged, for example by tearing, must be supported so that the face of the check is reconstructed and supported in its original configuration, so that a digital image reader can accurately digitize and subsequently read the amount of the check.

The document carriers and other repair devices known in the prior art do not meet these requirements. For example, the above-referenced U.S. Pat. No. 3,702,924 to Wood and Wood discloses a document carrier which is in the form of an envelope which is open along its top edge, and which has a translucent front sheet. Although the translucent front sheet allows a check contained in the carrier to be photographed or microfilmed, it is not considered sufficiently transparent to ensure accurate digital imaging of the face of a check through the translucent front sheet.

Accordingly, it is the object and purpose of the present invention to provide an improved document carrier and repair device which is operable to support and carry a physically damaged check while also allowing the face of the check to be digitally imaged and the back of 18 the check to be photographed, microfilmed, or also digitally imaged.

It is another object and purpose of the present invention to provide a document carrier and repair device which achieves the foregoing object of supporting the check while also leaving visible the entire front and back surfaces of the check.

It is yet another object and purpose of the present invention to provide a document carrier and repair device which achieves the foregoing object and which also allows a torn or otherwise damaged check to be fully rehabilitated, supported and maintained in its original condition suitable for imaging or photographing.

SUMMARY OF THE INVENTION

The present invention meets the foregoing objects and purposes by providing a document backer that includes a rectangular, translucent backing sheet having a vellum strip adhered along the lower edge thereof. The translucent backing sheet includes an adhesive, on the same side thereof as the attached vellum, by which the back of a check or other document can be affixed to the backing sheet, such that the check is positioned immediately above the vellum strip. The vellum strip accepts magnetically readable imprinting while the backing sheet supports the check so that its face can be digitally imaged free of any visual impairment. The backing sheet and vellum strip allow a damaged check to be both digitally imaged and magnetically transcribed in contemporary check processing equipment. Additionally, the back of the check can be microfilmed, photographed, or digitally imaged through the translucent backing sheet with sufficient resolution for record keeping purposes.

A cover sheet may be provided for use particularly where the adhesive on the backing sheet is a pressure sensitive adhesive. The cover sheet is formed of a sheet material that does not permanently adhere to the adhesive on the backing sheet, thereby enabling its easy removal prior to use.

The document backer may be manufactured in discrete rectangular sheets. Alternatively the backer may be manufactured in a continuous roll which is cut to form individual document backers of appropriate length when needed, either manually or by automated equipment.

These and other aspects of the present invention will be more apparent upon consideration of the following detailed description of the invention, when taken with the accompanying drawings.

BRIEF DESCRIPTION OF THE DRAWINGS

The Figures set forth in the accompanying drawings form a part of this specification and are hereby incorporated by reference. In the Figures.

DESCRIPTION OF THE PREFERRED EMBODIMENTS

Figure 1:
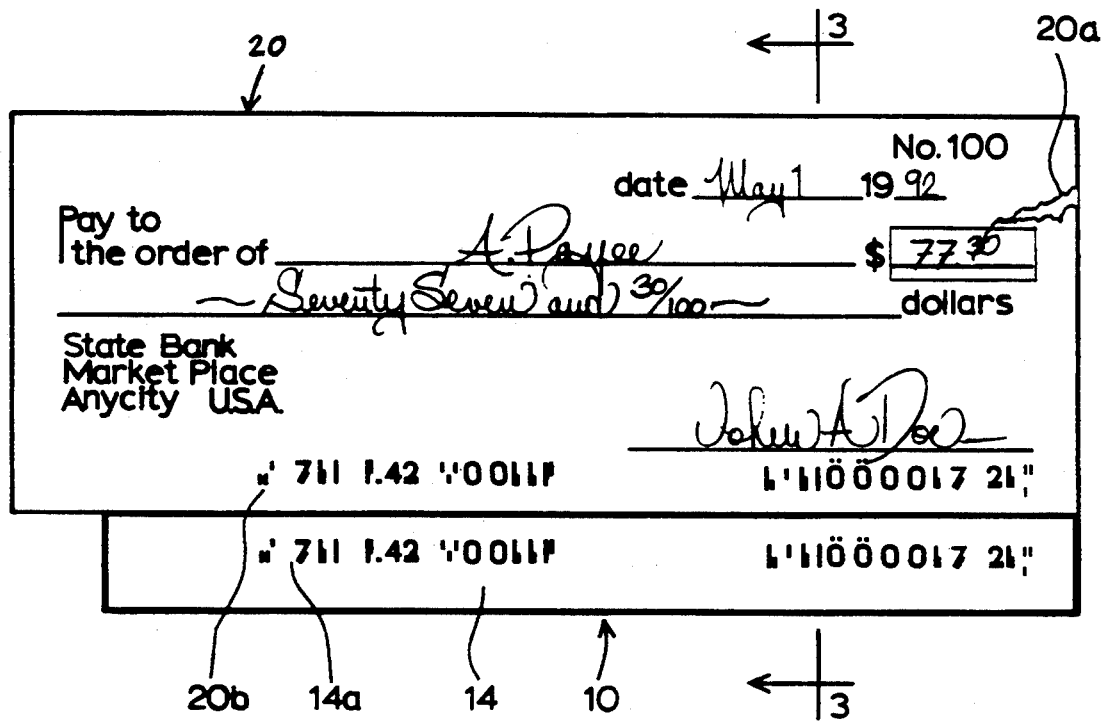
FIG. 1 illustrates a front view of the document backer of the present invention, with a damaged check supported on the backer.
Figure 2:
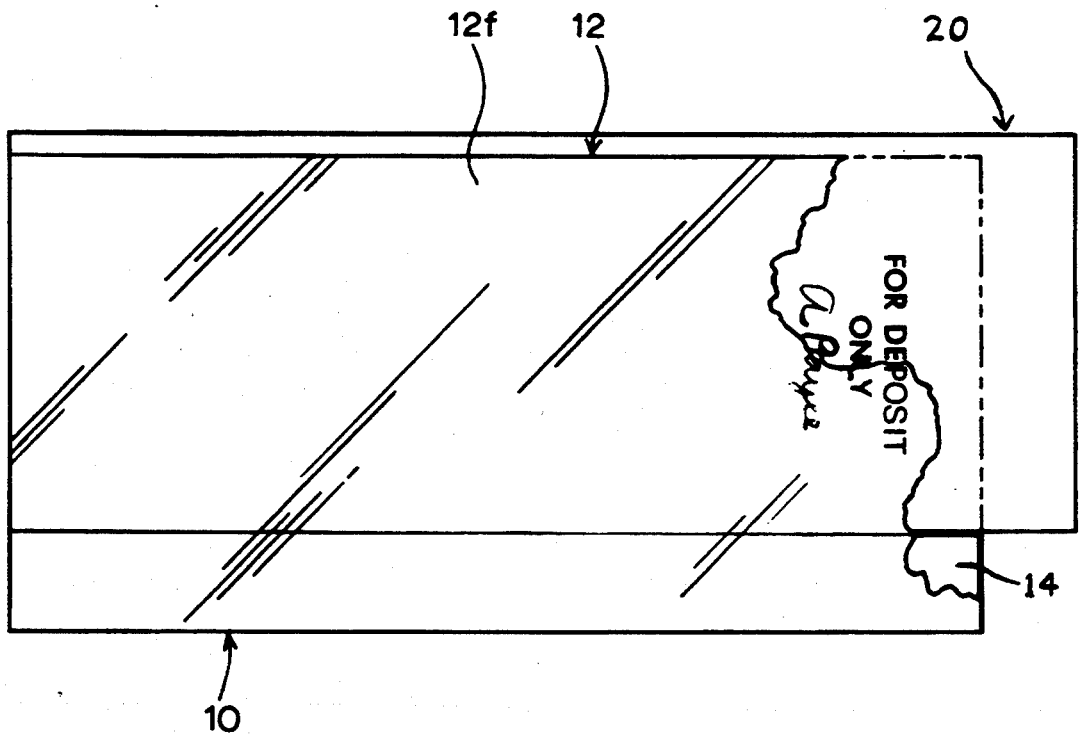
FIG. 2 illustrates a back view of the document backer and damaged check of FIG. 1, with the backing sheet of the backer partly broken away to illustrate the translucent nature of the sheet.
Figure 3:
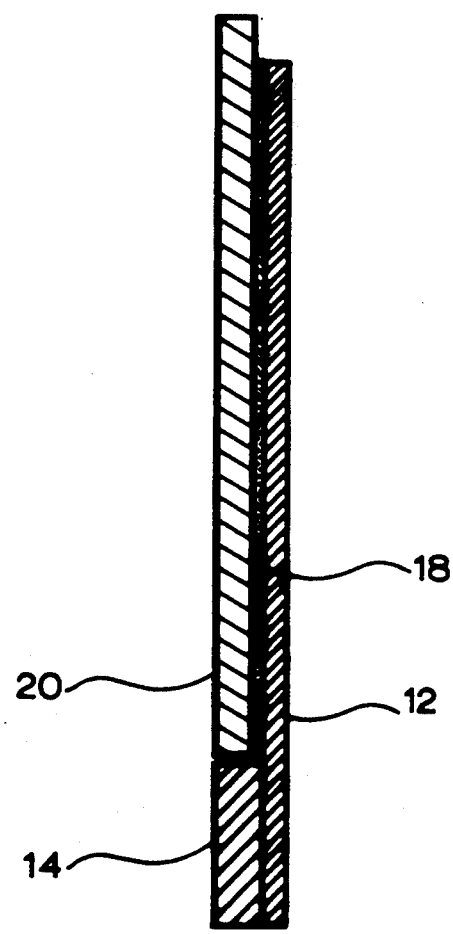
FIG. 3 illustrates an end view in cross section, taken along section line 3—3 of FIG. 1, of the document backer and damaged check of FIG. 1, with the thicknesses of the sheet materials exaggerated for purposes of illustration.
Figure 4:
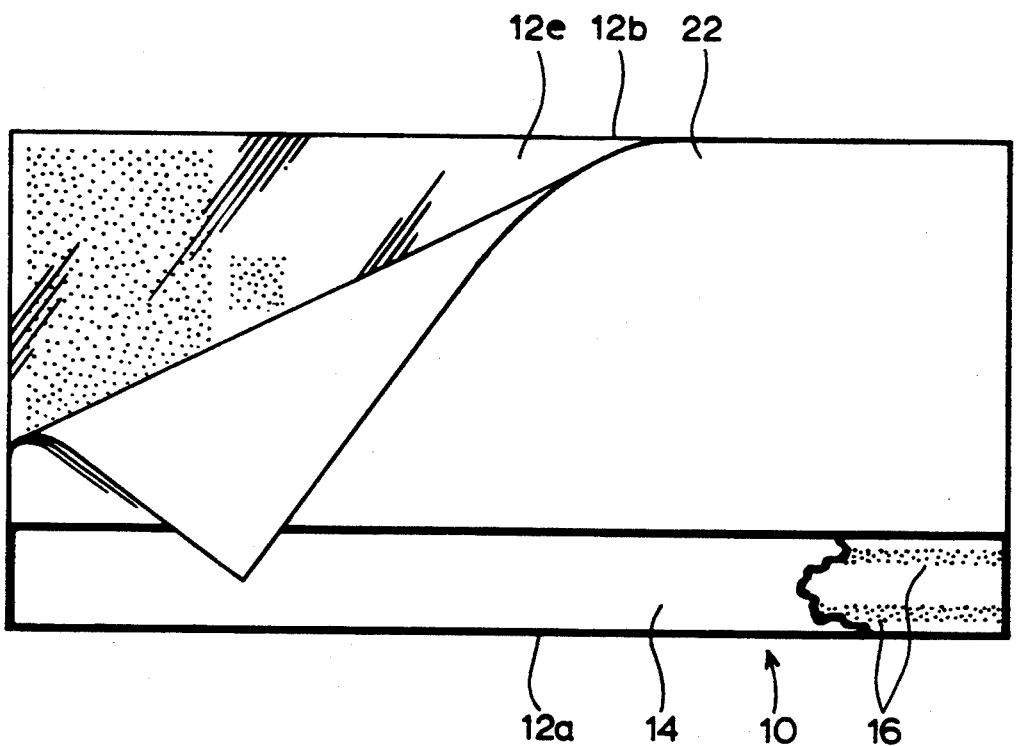
FIG. 4 illustrates the document backer without any check, but including a detachable cover sheet that is applied to the backer during its manufacture (shown partly removed), and which is normally removed when it is used.
Figure 5:
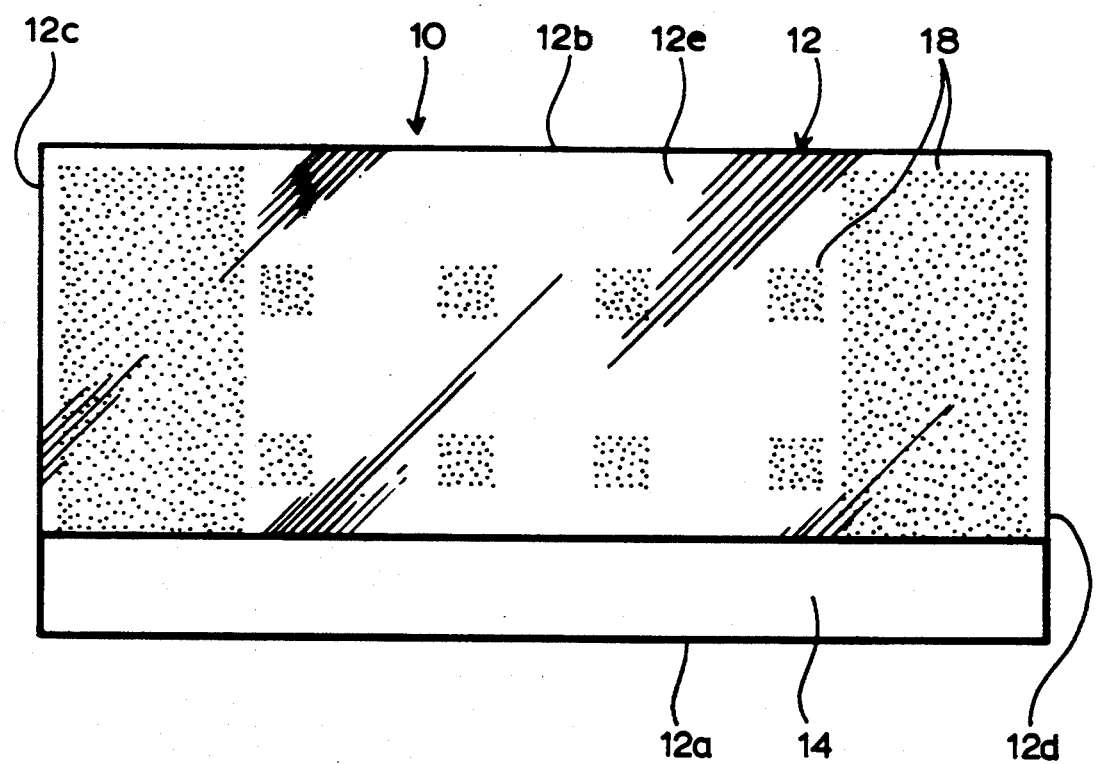
FIG. 5 is a front view of the backer of FIG. 4, with the cover sheet removed to show the adhesive used to affix a check.

There is illustrated in FIGS. 1 through 5 a document backer 10 which constitutes a preferred embodiment of the present invention. The document backer 10 includes a rectangular, translucent backing sheet 12 having a lower edge 12a, an upper edge 12b, and left and right end edges 12c and 12d respectively. The backing sheet 12 also includes a front surface 12e (FIGS. 4 and 5), and a back surface 12f (FIG. 2).

The document backer 10 further includes a vellum strip 14, which is approximately ⅝ of an inch wide, and which is adhered to the front surface 12e of the backing sheet 12 so that the lower edge of the vellum strip 14 is coincident with the lower edge 12a of the backing sheet 12. The vellum strip 14 is affixed to the backing sheet 12 with a suitable adhesive 16. In the illustrated embodiment of FIG. 4 the adhesive 16 is preferably applied in two spaced parallel strips so that it does not impair the quality of the imprinted MICR characters. The vellum strip 14 is ordinarily permanently affixed and is not intended to be removable. The vellum strip 14 shown in FIG. 1 is imprinted with magnetically readable characters 14a.

The backing sheet 12 further includes on its front face 12e a set of spaced adhesive glue patterns 18, which allow a damaged check 20 to be firmly retained for rehabilitation and during processing through data processing machines, while also allowing the check 20 to be easily removed if desired. FIGS. 1 and 2 illustrate the damaged check 20 as having a tear 20a passing through the numerical dollar amount on the face of the check. With contemporary digital imaging and reading machines, this numerical amount, which is frequently handwritten, constitutes the critical image on the face of the check 20. Consequently, it important that the check 20 can be rehabilitated by being physically positioned so that it appears as nearly as possible as originally written, and then firmly retained in that position by adhesion to the backing sheet 12.

The adhesive 18 on the face of the backing sheet may be either pressure sensitive or heat sensitive (hot melt). A pressure sensitive adhesive is preferred where checks are to be manually affixed. Where automated systems are to be used the adhesive may either be pressure sensitive or heat sensitive.

When the adhesive 18 is a pressure sensitive adhesive, the document backer 10 is preferably manufactured and shipped with a removable cover sheet 22 which covers the exposed portion of the front surface 12e. The cover sheet 22 is preferably formed of a polymeric or coated paper which does not permanently adhere to the adhesive 18 and which can thus be easily and quickly removed so as to expose the adhesive 18.

The document backer 10 may be manufactured and used manually in discrete rectangular sheets, as illustrated in the Figures. Alternatively, the backer 10 may be manufactured and shipped in a continuous roll, in which case the backer 10 is cut to a required length in an automated document repair processing machine. One advantage of using the backer automated equipment is that strips of the backer can be automatically cut in lengths which precisely match the check to be attached, thereby facilitating subsequent automated processing of the combined backer and check.

It will be noted that one advantage of the present invention is that the damaged check 20 abuts the vellum strip 14, so that there is a nearly smooth continuum between the face of the check and the face of the vellum strip. This results no overlapping paper components, which in turn ensures fewer document misfeeds in automated data processing machines and a lower likelihood that the check will be dislodged from the backing sheet during handling or processing.

Also, it will be noted (FIG. 2) that the back of the check 20 is entirely exposed through the translucent backing sheet 12, so that the back of the check 20 may be photographed, microfilmed or digitally imaged. In this regard, it should be noted that, whereas it is desirable that the front of the check be perfectly visible and unimpaired by any kind of translucent sheet to ensure the accurate digital reading of the monetary amount, the endorsements and instructions on the back of the check are normally only imaged for record keeping purposes, and for these purposes it is acceptable for the back of the check to be viewed through a translucent sheet.

In use, the document backer 10 is prepared by first removing the optional cover sheet 22, if present, to expose the front surface 12e of the backing sheet and the adhesive patterns 18. The back of a damaged check 20 is then adhered to the front surface 12e of the backing sheet 12, with the lower edge of the check 20 abutting and aligned with the upper edge of the vellum strip 14. The check 20 is reconstructed as best as possible, with for example the tear 20a being positioned so that the numerical amount of the check is readable in substantially the same form as in the original undamaged check. It will be appreciated that the original face of the check 20 is presented for processing and digital imaging with no visual distortion or impairment, thus facilitating optimum digitization of the face of the check 20.

Generally concurrently with attaching the damaged check 20 to the backing sheet 12, the vellum strip 14 is imprinted with magnetically readable characters 14a which reproduce the original characters 20b on the check 20. Upon being so assembled and imprinted, the combined check 20 and backer 10 may be processed as a single document through standard document processing equipment. Upon completion of processing, the damaged check 20 may be removed unaltered from the document backer 10, if desired.

The present invention has been described and illustrated with reference to a preferred embodiment. Nevertheless, it will be understood that various modifications, alterations and substitutions may be apparent to one of ordinary skill in the art, and that such modifications, alterations and substitutions may be made without departing from the essential invention. Accordingly, the present invention is defined only by the following claims.

The embodiments of the invention in which patent protection is claimed are:

1. A document backer for holding a document of a specified thickness, comprising a backing sheet having front and back surfaces, said backing sheet being sufficiently translucent to enable a back surface of the document to be read and photographed therethrough, said backing sheet including an adhesive affixed to said front surface for attaching the document thereto, and a vellum strip affixed to a lower portion of said front surface of said backing sheet for receiving imprinted magnetically readable characters, said vellum strip being of a thickness comparable to the document thickness and being positioned so as to enable a lower edge of the document affixed to said backing sheet to abut said vellum strip, said vellum strip having a front surface lying in a common plane with a front surface of the document to thereby provide a nearly smooth continuum between the front surface of the document and the front surface of the vellum strip, and so that when the document is affixed to said from surface of said backing sheet the front surface of the document may be viewed unimpeded in any way while the back surface of the document may be viewed through said backing sheet.

2. The document backer defined in claim 1 wherein said backing sheet includes multiple areas on said front surface to which are applied a pressure sensitive adhesive.

3. The document backer defined in claim 1 further comprising a detachable cover sheet which is applied to said document backer during manufacture and retained thereon during storage, and which is removed prior to use.

4. The document backer defined in claim 3 wherein said detachable cover sheet is formed of a glassine sheet material that can be readily detached from said adhesive.

5. The document backer defined in claim 1 wherein said vellum strip is irreversibly adhered to said backing sheet.

6. The document backer defined in claim 1 wherein said backing sheet includes multiple areas on said front surface to which are applied a heat sensitive adhesive.

7. A document backer for holding a document of a specified thickness, comprising a translucent backing sheet through which the document can be read, said backing sheet having front and back surfaces, said backing sheet including an adhesive on said front surface for attaching a document thereto, a vellum strip affixed to a lower portion of said from surface for receiving magnetically readable characters, and a disposable cover sheet detachably adhered to said front surface of said backing sheet, said cover sheet abutting said vellum strip, whereby said cover sheet may be removed just prior to use to expose said adhesive, said vellum strip being of a thickness comparable to the document thickness and being positioned so as to enable a lower edge of the document affixed to said backing sheet to abut said vellum strip, said vellum strip having a from surface lying in a common plane with a front surface of the document to thereby provide a nearly smooth continuum between the front surface of the document and the front surface of the vellum strip, and so that when the document is affixed to said front surface of said backing sheet the front surface of the document may be viewed unimpeded in any way while the back surface of the document may be viewed through said backing sheet.

8. The document backer defined in claim 7 wherein said backing sheet includes multiple areas on said front surface to which are applied a pressure sensitive adhesive.

9. The document backer defined in claim 7 wherein said detachable cover sheet is formed of a glassine sheet material that can be readily detached from said adhesive on said front surface of said backing sheet.

10. The document backer defined in claim 7 wherein said vellum strip is irreversibly adhered to said backing sheet.

11. The document backer defined in claim 7 wherein said backing sheet includes multiple areas on said front surface to which are applied a heat sensitive adhesive.

* * * * *